Jan. 28, 1964   A. G. HEGGEM   3,119,594
SWING GATE VALVE
Filed Feb. 17, 1961   3 Sheets-Sheet 1

INVENTOR.
ALF G. HEGGEM
BY
Head & Johnson
ATTORNEYS

INVENTOR.
ALF G. HEGGEM

BY

*Head & Johnson*

ATTORNEYS

INVENTOR.
ALF G. HEGGEM
BY
Head & Johnson
ATTORNEYS

United States Patent Office 3,119,594
Patented Jan. 28, 1964

3,119,594
SWING GATE VALVE
Alf G. Heggem, Tulsa, Okla., assignor to Orbit Valve
Company, Tulsa, Okla., a corporation of Oklahoma
Filed Feb. 17, 1961, Ser. No. 90,114
4 Claims. (Cl. 251—228)

This invention concerns a type of valve. More particularly, this invention relates to an improved swing gate valve construction for use in relatively high pressure fluid flow conditions.

A primary object of this invention is to provide an improved gate valve of the type in which a swing or pivotal valve member is adapted for controlled movement against flow pressure, between a position of sealed closure with a valve seat to a fully open position. In the latter position the valve member is out of the way to provide a full open flow passageway from inlet to outlet.

Another object of this invention is to provide an improved swing gate valve construction in which the valve is pivotally movable against the force of fluid pressure by a vertically movable and vertically guided valve stem.

A further object of this invention is to provide an improved swing gate valve having a relatively straight through inlet and outlet passageway through a valve body. Flow is controlled within a chamber between the inlet and outlet, using a pivotal or swing-type valve member. Movement of the valve is controlled by a vertically movable valve stem and follower or crank pin cooperating with a cam slot on the valve. The valve stem and crank pin are vertcially guided and supported to prevent horizontal bending moments due to high fluid flow pressure.

A yet still further object of this invention is to provide a pivotal or swing type gate valve in which the valve elements and actuating controls for same are readily removable and replaceable from a valve body with a cap or bonnet member which is typically saelingly attached to the valve body.

A yet further object of this invention is to provide an improved and economical form and construction of gate valve which offers efficient operation, ease of manufacture, assembly, operation and replacement of vital working parts.

These and other objects of this invention will become more apparent upon further reading of the specification and claims when taken in conjunction with the illustrations of which:

*Description*

Figure 1:
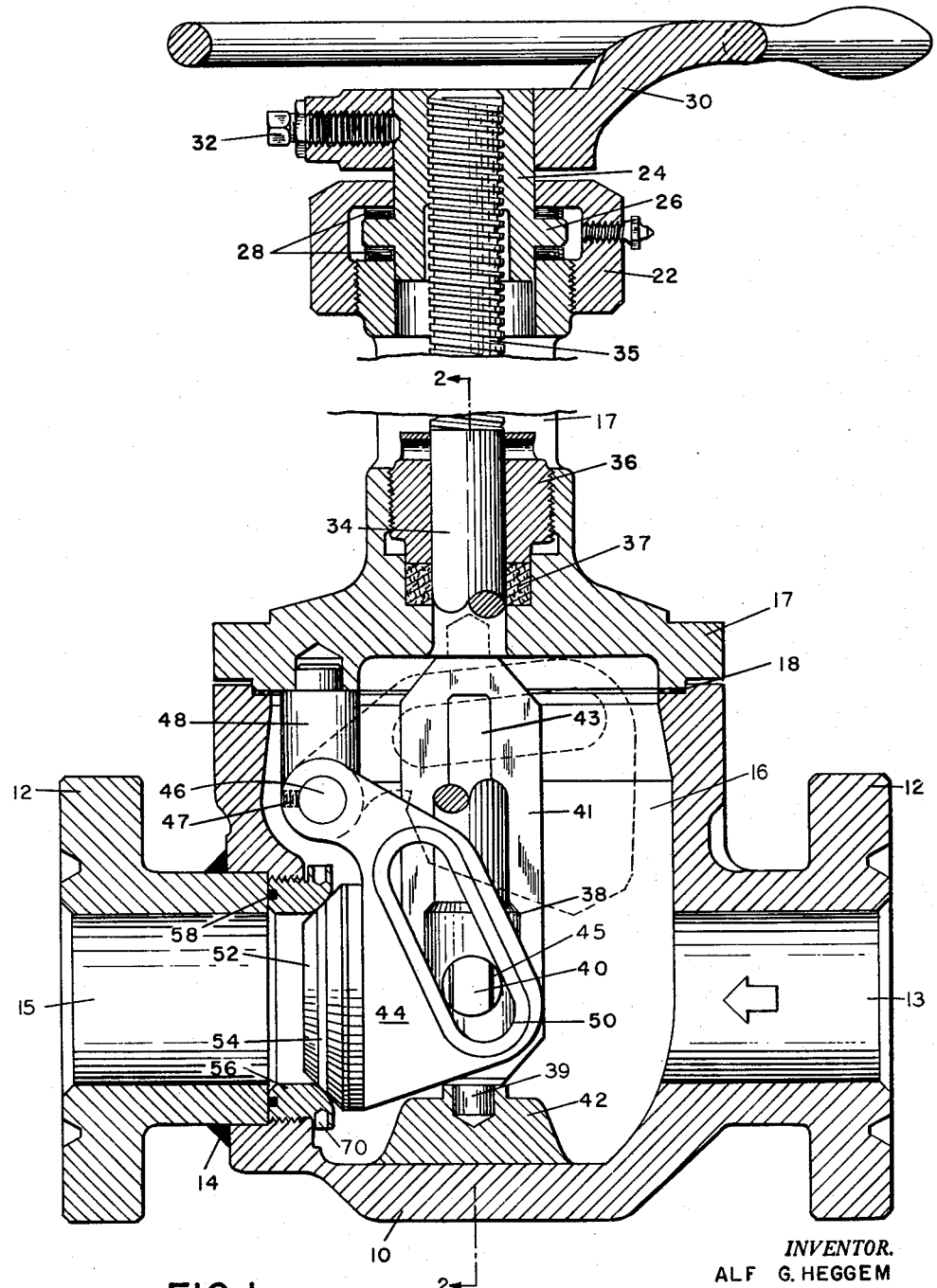
FIGURE 1 is a vertical sectional view of the swing gate valve constructed according to this invention.

The construction of the valve according to this invention shown in all views includes a valve body portion 10 to which suitable attachment flanges 12 are cast or welded, such as at 14, to form a substantially aligned straight through passageway having an inlet 13 and outlet 15. It is to be understood, however, that other forms of conduit couplings are adaptable to valve body 10, such as threaded or welded connectors. Intermediate the inlet 13 and outlet 15 is the valve and valve operating system chamber 16. The chamber 16 is capped and sealed using bonnet 17 and gasket 18 which is attached to the valve body 10 by a plurality of cap screws 20. The bonnet 17 typically extends vertically upward and terminates with a threaded bonnet nut 22. A bearing sleeve 24 includes a thrust portion 26 which is rotatingly supported within bonnet nut 22 by lubricated roller bearings 28. A handwheel 30 is locked with bearing sleeve 24 using set screw 32.

Figure 2:
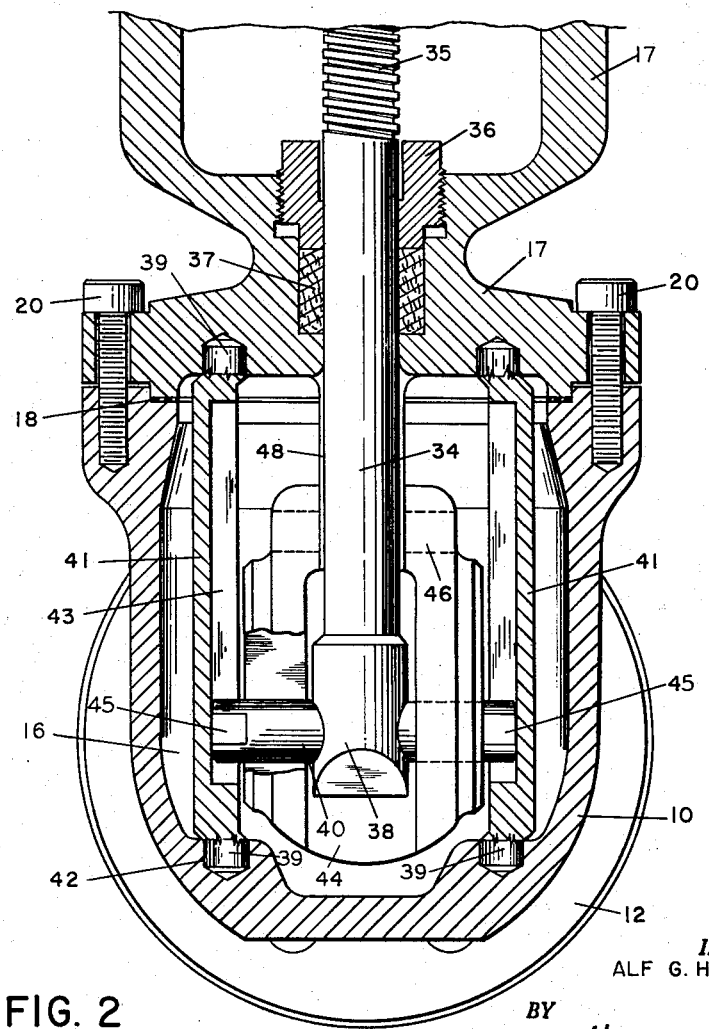
FIGURE 2 is an additional vertical sectional view taken along the line 2—2 of FIGURE 1.
Figure 3:
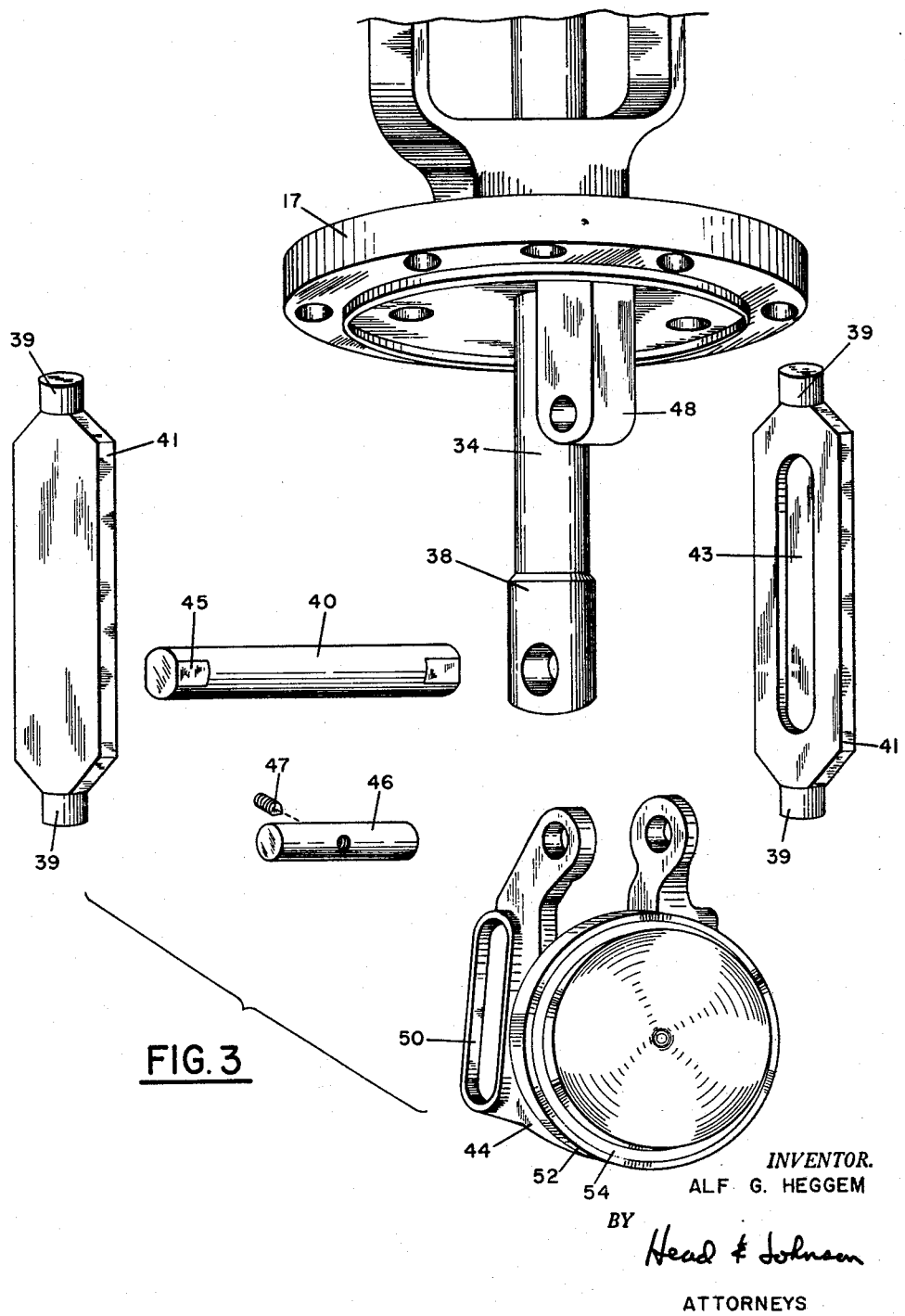
FIGURE 3 is an exploded view of the valve and valve operating parts as they are removably positioned with respect to the valve bonnet.

A valve stem 34 is vertically movable through bonnet 17 under the cooperative rotation of handwheel 30, bearing sleeve 24 and internal square threads which engage with square threads 35 formed at the upper end of the valve stem 34. The valve stem 34 is sealed within the bonnet 17 using any well known type of packing 37 held by a gland nut 36. At the lower end of the valve stem 34 an enlarged portion 38 is adapted to receive a member such as crank pin 40, which extends transverse to the direction of flow. Crank pin guides 41 extend vertically on each side of the valve stem 34 between a lower support 42 and bonnet 17. Upper and lower support posts 39 position the guides in their respective operating positions with respect to crank pin 40. Vertical guide slots 43 are adapted for engagement with the milled end or guide portions 45 of crank pin 40 to provide vertical sliding support therewith. In FIGURE 1 a portion of valve stem 34 is broken away in order to show a partial frontal elevation view of the vertical guide supports 41 and slot 43 which is also shown in the cross-section of FIGURE 2.

Valve member 44 straddles and is pivotally supported on shaft 46, the latter of which is held stationary to pivot post 48 using set screw 47. Pivot post 48 is retained within the bonnet portion 17 and is removable therewith. The valve member includes dual cam slots 50 which substantially straddle the valve stem 34 and the enlarged portion 38. The round portion of crank pin 40, i.e., adjacent the guide portions 45, operates within the cam slots to control the opening and closing of valve member 44. The valve face 52 typically includes in one embodiment a resilient portion 54 which is adapted to sealingly engage with valve seat 56. The valve seat 56 is threadably assembled and sealed with respect to valve body 10 using packing or O-rings 58. The configuration of the mating surfaces of the valve face and valve seat are adapted to provide sealed closure of the flow passageway.

Accordingly, it can be readily seen that in the operation of the valve of this invention improved and efficient results are obtained by providing a vertically supported valve stem which is capable of operating the valve 44 between a fully closed position to a fully open position. This movement is accomplished against the high pressure flow conditions which may exist in the inlet 13 and which tend to move the valve toward its seat. Additionally, this invention provides valve and valve operating parts which can be readily assembled, removed or replaced upon removal of the bonnet portion 17 from the valve body 10.

In use, rotation of handwheel 30 in a counterclockwise direction will force the valve stem upward vertically as the threaded portion 35 advances with respect to rotation of bearing sleeve 24. The round surface of crank pin 40 cooperates with the cam slot 50 to swing the valve 44 on its pivot pin 46 to an open position as substantially shown by the dotted line configuration. The vertical guides 41 and cooperative sliding of guide portions 45 of crank pin 40 in the slots 43 act to prevent rotation and more importantly support the valve movement against horizontal flow pressure and hence prevent bending of the crank pin follower and valve stem.

Clockwise rotation of handwheel 30 reverses the procedure. In addition there is a "wedging" action of crank pin 40 within the cam slot 50 to force the valve into sealed engagement with its matching seat.

A yet additional feature of this invention is the complete removability and replacement of the valve, valve operating components and valve seat upon removal of the bonnet. In addition all parts are readily assembled without the use of special tools and hence, permits replacement without removing the valve body from the flow connection.

The invention has been described by reference to specific and preferred embodiments. It will be apparent, however, that many modifications can be made without departing from the spirit of the invention. For example, the specific reference in the specification and claims to vertical and horizontal parts of the valve of this invention has been made for descriptive purposes only and to show the orientation of the parts since the valve can be positioned in many directions. Accordingly, this invention should be construed not to be limited to the embodiment herein described, but should be limited only by the scope of the appended claims.

What is claimed:

1. A valve comprising in combination, a valve body and a removable bonnet sealingly attached thereto, a horizontal passageway in said body defining an inlet and outlet, a valve seat in said passageway facing said inlet, a valve stem vertically and sealingly movable through said bonnet, a crank pin attached near the lower end of said valve stem and extending horizontally transverse to said passageway, a valve pivotally supported from said bonnet to move from a closed passageway position of sealed engagement with said seat to a fully open passageway position, cam slots on said valve, said slots to substantially straddle said stem and slidingly engage with said crank pin, removable guides vertically extending between said valve body and said bonnet, each guide including vertical guide slots to receive and to slidingly support said crank pin, whereby said valve stem is prevented from horizontal bending.

2. A valve comprising in combination, a valve body and a removable bonnet sealingly attached thereto, a horizontal passageway in said body defining an inlet and an outlet for fluid flow, a valve seat in said passageway facing said inlet, a valve stem vertically and sealingly movable through said bonnet, a crank pin attached near the lower end of said valve stem having extensions horizontally transverse to said passageway, on each side of said valve stem, said extensions each having a round portion and end guide portion, a valve pivotally supported from said bonnet to move from a closed passageway position of sealed engagement with said seat to a fully open passageway position, cam slots on said valve, said slots to substantially straddle said stem and slidingly engage with said round portions of said crank pin, removable guides vertically extending between said valve body and said bonnet, each guide including vertical guide slots to receive and to slidingly support each end guide portion of said crank pin to substantially prevent movement of said crank pin and said valve stem in the direction of said flow.

3. A valve of the type described in claim 2 wherein said valve, said valve stem and crank pin, and said vertical guides are removably attached to said bonnet and are structurally interrelated to the bonnet so that they are removable therewith when said bonnet is removed from said valve body.

4. A valve of the type described in claim 2 wherein said vertical guides include identical upper and lower support posts for retention within said valve body and said bonnet.

References Cited in the file of this patent

UNITED STATES PATENTS

| 961,594 | Fischer | June 14, 1910 |
| 2,224,231 | Mohr | Dec. 10, 1940 |
| 3,006,596 | Nelson | Oct. 31, 1961 |

FOREIGN PATENTS

| 72,858 | Norway | of 1948 |
| 476,860 | Italy | Dec. 29, 1952 |